July 11, 1950
W. A. ANDERSON
2,514,619
STROBOSCOPIC DEVICE
Filed April 26, 1946
2 Sheets-Sheet 1
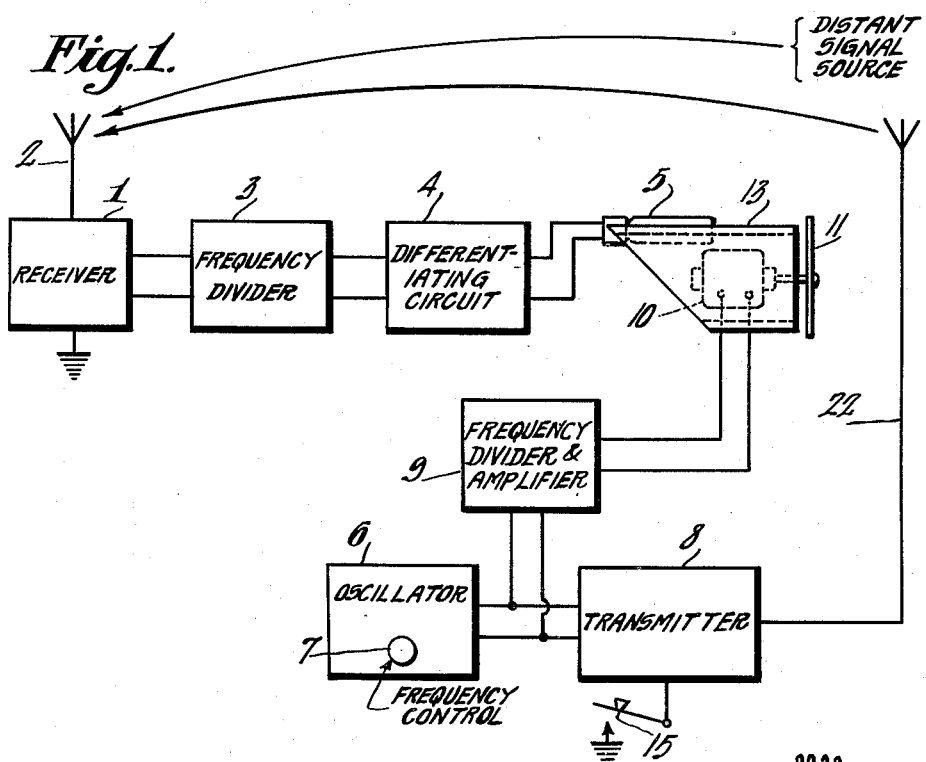
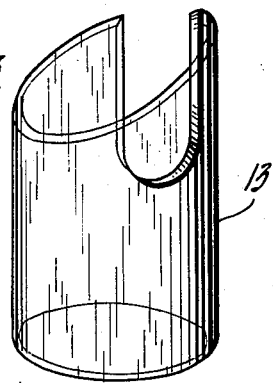
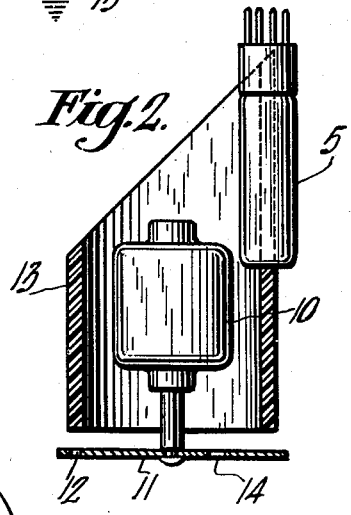
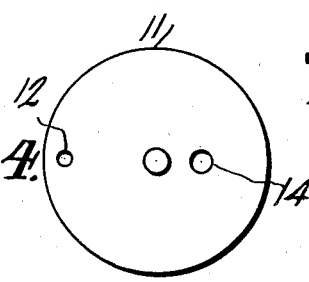
INVENTOR
Warren A. Anderson
BY
H. S. Grover
ATTORNEY

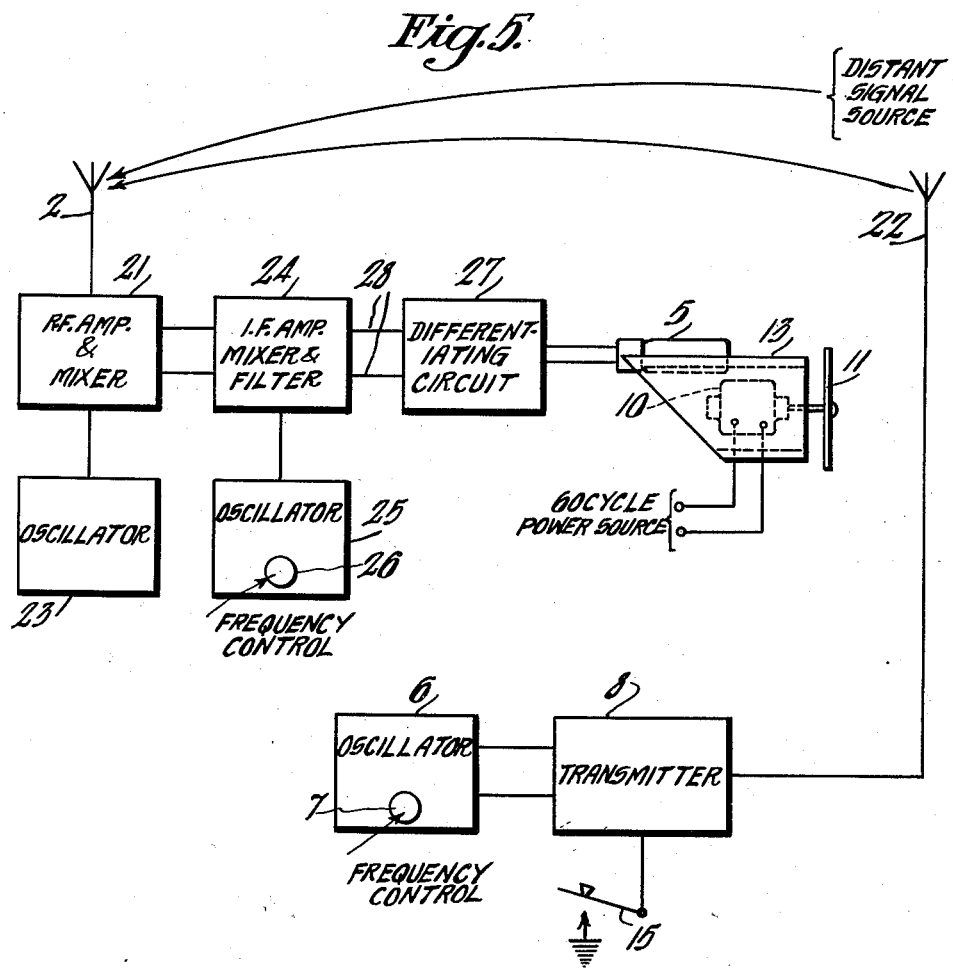

Patented July 11, 1950

2,514,619

UNITED STATES PATENT OFFICE 2,514,619

STROBOSCOPIC DEVICE

Warren A. Anderson, West Brighton, N. Y., assignor to Radio Corporation of America, a corporation of Delaware Application April 26, 1946, Serial No. 665,303

1 Claim. (Cl. 88—14)

This invention relates to apparatus for comparing two frequencies having small cyclic differences. It is in effect a specific type of stroboscope.

There are many applications for stroboscopic devices. For example, in warfare it is sometimes required to determine the frequency of a signal coming in from an enemy station and to adjust the frequency of a transmitter so that jamming signals of the same frequency may be radiated. This, however, is only one illustrative application of my invention.

Heretofore it has been the practice to mount a glow tube on a rotatable member and to cause this tube to flash in accordance with a frequency which is to be compared with the frequency of the alternating current used to motivate the rotating element. The stroboscopic indications (which depend on the persistence of vision) are such that one or more light spots appear in the orbit of the glow tube. If the revolutions of the rotor and the frequency of the flashes are synchronized, the spot appears stationary. Slight departures from synchronism produce an apparent slow rotation of the light spot.

A disadvantage of such a system is that the flashing light must be connected by slip rings and brushes to its energizing source.

It is an object of my invention to provide a frequency comparator which is free from the objections found in stroboscopic devices of the prior art.

It is another object of my invention to provide stroboscopic apparatus which utilizes the wave guide properties of certain plastics for visible light and which enables one to distribute a beam of light throughout the circumference of a ring and to view a spot of light through an aperture in a rotating disc, said aperture being disposed in front of the plastic element in such a way as to provide stroboscopic indications.

Other objects and advantages of my invention will be brought out in the description which follows. This description is to be read in view of the accompanying drawing in which:

Fig. 1 shows diagrammatically a combination of circuit elements and other apparatus more or less essential to the carrying out of my invention;

Fig. 2 shows a sub-assembly of apparatus units including a flashing lamp, a plastic cylindrical element for transmitting light rays directively, and a motor carrying on its shaft an apertured disc for viewing light spots at the instants of flashing of the lamp;

Fig. 3 is a perspective view of the light transmitting plastic element;

Fig. 4 is a face view of the masking disc which is used for producing stroboscopic effects; and Fig. 5 shows diagrammatically a modified circuit arrangement wherein the stroboscopic indications result from driving the motor at a constant speed and varying the frequency of a local oscillator to cause heterodyning of its output with the frequency of an incoming signal wave.

Referring first to Fig. 1, I show therein a radio receiver 1 which is fed with incoming signal energy by an antenna 2. The output from this receiver may be applied to a frequency divider 3 and thence to a differentiating circuit 4, by means of which short, sharp pulses may be obtained for exciting the flasher tube 5. This tube is preferably chosen from among several which are commercially available. In the apparatus which was built and tested by the applicant, a Sylvania type 631-PI tube was used. This tube possesses certain characteristics such that the gas contained therein flashes with considerable brilliancy upon excitation by means of a control grid. A very heavy flow of current takes place between its cathode and anode. The tube is suitable only as a flasher lamp because of this heavy current flow which would destroy the lamp if it were allowed to continue steadily. The duration of the flash is of the order of one-tenth of a microsecond.

The frequency source with which the incoming signal wave is to be compared may be derived from an oscillator 6 having a suitable range of frequencies any one of which may be selected by means of a frequency control device 7. This oscillator delivers a suitable wave both to the transmitter 8 and to a frequency divider and amplifier unit 9. The output from the unit 9 may be of suitable amplitude and frequency to drive a synchronous motor 10. On the shaft of this motor I mount an apertured disc 11. A face view of this disc is shown in Fig. 4. The aperture 12 is radially distant from the center of the disc by an amount equal to the mean radius of the cylindrical wall of a translucent plastic member 13. The material of this member is such as to readily transmit light in a directive manner within its substance. The plastic known as methacrylate is a very efficient material for this purpose.

The plastic cylinder is notched at one end to provide for the entry of the tube 5 into alignment with the cylinder wall so that the light can readily enter edgewise into the cylinder. The back end of the cylinder terminates at its intersection with a plane which lies substantially at a 45° angle to the axis in order that the light may be efficiently reflected toward the rectangular front end of the cylinder.

The dispositions of the tube 5, the translucent cylinder 13, the motor 10 and the disc 11 relative to one another are clearly shown in the cross-sectional view of Fig. 2. The aperture 12 in the disc 11 is opposed by a larger aperture 14 which is closer to the center of rotation and which provides for balancing the disc.

The output from the transmitter 8 may be keyed on and off by means of a key 15.

The details of structure to be comprehended within the several apparatus units of Fig. 1 are not herein specified since they are well known in the art and different applications of the invention may dictate alternative components which are readily chosen by those skilled in the design of electronic circuits.

The operation of my invention when it is used according to the illustrative application aforementioned may be described as follows:

Assuming that a signal from an enemy station is received on receiver 1, and assuming further that a carrier wave of this signal is to be opposed by radiation from the transmitter 8 at the same frequency, then, after applying the enemy signal carrier wave to the frequency divider 3 and the differentiating circuit 4, it will be seen that the frequency of flashes in the tube 5 will provide a frequency indication with which a locally derived wave may be compared. The oscillator 6 delivers a frequency which may be adjusted by the frequency control member 7 so as to approach the frequency of the incoming signal. The frequency divider unit 9 is adjustable to obtain the same submultiple as that derived from the frequency divider 3. If, however, a different ratio of division is desired, the system is still operative, but the number of indications or light spots which will appear on the light ring as a result of the stroboscopic action will vary as a function of the division ratios which hold for the respective frequency dividers.

Assuming now the speed of the motor 10 and the disc 11 is such that a relatively small frequency difference is indicated between the two sources, then the oscillator frequency control device 7 may be moved forward and backward until a stationary indication is made on the stroboscopic indicator. With that accomplished, a jamming signal can be transmitted by manipulation of the key 15, which causes the transmitter 8 to radiate a signal of the same frequency as that of the enemy signal.

It will be clear from the foregoing part of this specification that for other applications of my stroboscopic system any two frequencies within a narrow band may be compared, one frequency being applied at the receiver 1 while the other is derived from the oscillator 6. Furthermore, two widely different frequencies can also be compared if certain sub-harmonics thereof are brought into mutual proximity for purposes of producing a stroboscopic effect. If a comparison between two frequencies is all that is required then, of course, the transmitter 8 may be eliminated.

Referring now to Fig. 5, I show therein a modified circuit arrangement which differs from that of Fig. 1 in certain important respects and which for certain applications may be preferred. In this figure, parts which are like those in Fig. 1 are given the same reference numerals. A detailed description follows:

The radio frequency amplifier and mixer 21 is fed with incoming signal energy collected by an antenna 2. This signal energy may be either that of a distant source or it may be what is collected by monitoring the output from the local transmitter 8. In operation the frequency of the oscillator 6 which serves the transmitter 8 is so adjusted that a jamming signal may be radiated from the antenna 22 which is of the same frequency as that of the distant signal.

A local oscillator 23 serves to produce an intermediate frequency by mixing its output with the incoming signal energy collected on the antenna 2. An intermediate frequency amplifier and mixer 24 accepts the output from the unit 21. Into the unit 24, however, still another wave is injected, namely, the output from a variable frequency oscillator 25. The frequency of this output may be adjusted by means of a frequency control member 26. The oscillations delievered by the unit 25 are of a frequency which may be suitably heterodyned with the intermediate frequency delivered by the unit 21. The resulting beat frequency is filtered and fed to a differentiating circuit 27 over conductors 28. The pulse frequency of output from the unit 27 is suitable for exciting the lamp 5, where an observable stroboscopic effect is to be produced when the motor 10 is driven by power from a commercial 60-cycle source, for example. It will be understood, however, that for different ranges of pulse frequency there will be an appearance of one or more light spots through the orifice 12 in the rotating disc 11, depending upon the ratio between the pulse frequency and the cycles per second of the motor shaft.

In the embodiment shown in Fig. 5 it is unnecessary to deliver any of the output from the oscillator 6 to a frequency divider and amplifier unit 9 such as shown in Fig. 1. The oscillator 6, therefore, serves only to control the frequency of the carrier wave which is delivered as output from the transmitter 8 to the antenna 22. The key 15 is used as in the previously described embodiment of Fig. 1 to key the transmitter output on and off.

In the operation of the circuit arrangement of Fig. 5 the frequency of the distant signal source and the frequency of the transmitter 8 are readily compared in the following manner: The frequency of the oscillator unit 25 is adjusted to a suitable value so that a beat note is produced which is commensurate with the revolutions per second of the disc 11 or with some multiple frequency. The frequency adjustment can then be varied slightly until an essentially stationary stroboscopic pattern is obtained. At that moment the operator would key his transmitter 8 and produce an output frequency which may or may not be the same as that of the distant signal source. The frequency control member 7 will then be adjusted until the local signal collected by the antenna 2 produces the same stroboscopic pattern as that of the distant signal source, no change being made in the adjustment of the frequency control member 26. The jamming signal from the transmitter 8 will be so much stronger in its effect upon the R. F. amplifier and mixer unit 21 that no noticeable effect will be produced by the distant signal as long as the key 15 is held down. Immediately upon opening the key 15, however, the effect of the distant signal will be observed and can be conveniently compared with the frequency of the transmitter 8 as often as is desired.

My invention is capable of modification in various other ways without departing from its spirit and scope.

I claim:

Apparatus for producing a stroboscopic indication, comprising a translucent cylindrical-walled member which transmits light in a directive manner, the base face of said member being normal to its axis and its other end face lying in a plane at an angle of substantially 45° to said axis, an apertured motor-driven disk mounted coaxially with respect to said member, covering its base face, and having an aperture radially distant from the center of the disk an amount approximately equal to the mean radius of the cylinder so that through it the transmitted light may be observed, and means of the flashing lamp type situated within a recess in said other end of the cylinder and extending along the cylindrical wall of said member, the light being reflected from the 45° end face of the member to cause a ring of light to emerge from behind the circular orbit of said aperture.

WARREN A. ANDERSON.

REFERENCES CITED

The following references are of record in the file of this patent:

UNITED STATES PATENTS

| Number | Name | Date |
|---|---|---|
| 1,877,413 | Beck | Sept. 13, 1932 |
| 1,889,608 | Lord | Nov. 29, 1932 |
| 1,909,103 | Greiback | May 26, 1933 |
| 1,936,774 | Sparkes | Nov. 28, 1933 |
| 2,067,256 | Brush | Jan. 12, 1937 |
| 2,080,423 | Kane | May 18, 1937 |
| 2,113,011 | White | Apr. 5, 1938 |
| 2,187,551 | Zwack | Jan. 16, 1940 |
| 2,259,910 | Rylsky | Oct. 21, 1941 |
| 2,324,915 | Dow | July 20, 1943 |
| 2,352,082 | De Rosa | June 20, 1944 |
| 2,363,583 | Gilman | Nov. 28, 1944 |
| 2,412,991 | Labin | Dec. 24, 1946 |
| 2,418,139 | Preisman | Apr. 1, 1947 |
| 2,419,593 | Robinson | Apr. 29, 1947 |